United States Patent Office 3,331,817
Patented July 18, 1967

3,331,817
TRITHIOCARBONATE POLYMERS AND PROCESS FOR PREPARING THEM
Robert W. Liggett, Birmingham, Ala., assignor to Allied Chemical Corporation, New York, N.Y., a corporation of New York
No Drawing. Filed Mar. 2, 1965, Ser. No. 436,670
8 Claims. (Cl. 260—79.1)

ABSTRACT OF THE DISCLOSURE

Organic trithiocarbonate polymers and process for preparing them by reaction of bis-(2-chloroethyl)-formal, 1,2,3-trichloropropane and an alkali metal trithiocarbonate.

---

This invention relates to organic trithiocarbonate polymers, and more particularly to liquid polymers of this character which are capable of being cured to solid form with the aid of suitable curing agents.

In accordance with the present invention, liquid polymers, capable of curing by oxidation to solid polymers, are prepared in two steps; the first being the preparation of a solid polymer by the reaction of bis-(2-chloroethyl)-formal with a small amount, between about 2 and about 10 mole percent based on the total organic chlorides, of 1,2,3-trichloropropane, and an alkali metal trithiocarbonate in an amount substantially chemically equivalent to the organic chlorides, to produce a solid, acetone-insoluble polymer; followed by a second step of liquefying the solid polymer by reaction with aniline. In final use, the polymer is resolidified or curved by mixing it with an oxidizing agent such as lead dioxide. By chemically equivalent is meant an amount sufficient to react with all the chlorine atoms in the chlorides.

The following equations illustrate the process of the invention.

1. *Polymerization to solid polymer*

$$Na_2CS_3 + ClC_2H_4-O-CH_2-O-C_2H_4Cl + ClCH_2-CHCl-CH_2Cl \longrightarrow$$

Sodium trithiocarbonate     bis-(3-chloroethyl-formal)     1,2,3-trichloropropane

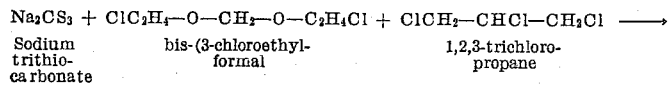

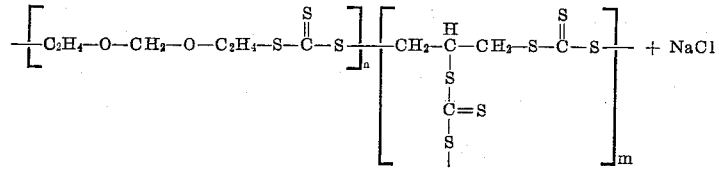

+ NaCl

*solid polymer* wherein $n$ is at least about 10 and $m$ is at least about 1, and wherein the ratio between $n$ and $m$ is between about 10:1 and about 50:1.

2. *Cleavage of cross-linked polymer*

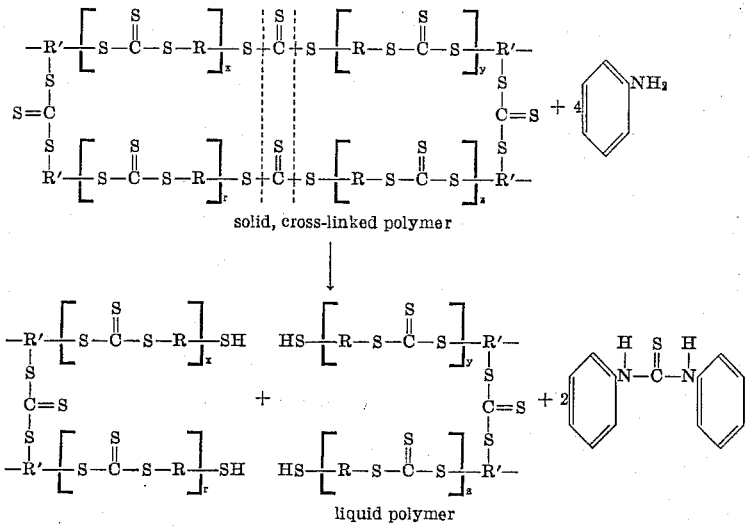

wherein R is the residue of bis-(2-chloroethyl)-formal, R' is the residue of 1,2,3-trichloropropane and wherein $x$, $y$, $r$, and $z$ are integers such that $x+y$ and $r+z$ are substantially equal to $n$. In the cleavage some of the cross-linking bonds

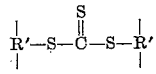

may also be broken in a similar manner. In addition, some of the cross-links may be broken to thiol (R'—SH) groups during the cleavage.

3. *Curing liquid polymer to reform a solid polymer*

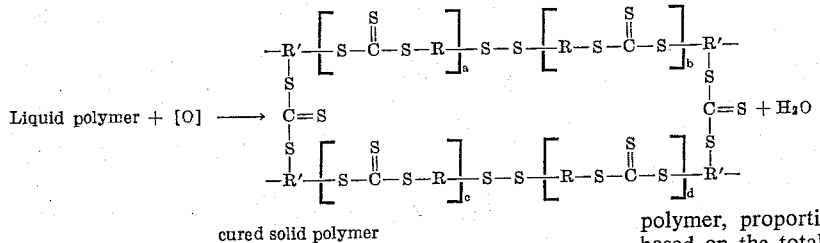

cured solid polymer wherein $a$, $b$, $c$, and $d$ are integers such that $a+b$ and $c+d$ are approximately equal to $n$ of the solid polymer.

The recombination of the polymer fragments that occurs when the liquid polymer is cured with an oxidizing agent, also occurs in random fashion so that the fragments are not necessarily recombined in the same order in which they existed in the solid polymer before cleavage. Moreover, the minor proportions of thiol groups formed by cleavage of the cross-links will also recombine in random fashion with the predominating groups, or with each other, and result in the introduction of a minor proportion of disulfide linkages, for example as illustrated below:

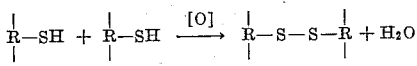

It is also possible that during the cure, some of the thiocarbonyl groups

may be oxidized to carbonyl groups

which will be present in minor amounts in the cured polymer. Therefore, as a result of these ancillary reactions, $a+b$ and $c+d$ will only approximately equal $n$, as the resolidified polymer will usually contain small proportions of these other groups, usually not more than about 10%.

The polymers of my invention, however, whether as initially produced in the solid state, or as liquefied by scission, or as resolidified by oxidation, are all characterized by containing predominantly the three types of repeating units shown below:

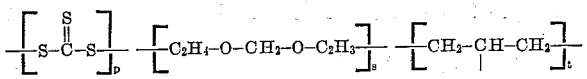

preferably present in relative proportions such that $p$ and $s+t$ are substantially in the ratio of 1:1, the ratio of $s$ to $p$ may range between 0.98 and 0.90; and the ratio of $t$ to $p$ may range between 0.02 and 0.10, groups $s$ and $t$ being linked in random fashion through the $p$, i.e., thiocarbonate, groups.

In addition, the polymers liquefied by scission contain a proportion of thiol groups (—SH) and the reconstituted polymers contain a proportion of disulfide groups, the exact proportion depending on the degree of scission of the original polymer during the entire treatment as brought out above.

In carrying out the initial polymerization Step 1 of the process of the invention, the bis-(2-chloroethyl)-formal and the 1,2,3-trichloropropane are caused to react with a substantially chemically equivalent amount of an alkali metal trithiocarbonate in a suitable solvent medium, such as a lower alkanol, or the chloride reactants may be suspended in a non-solvent, such as water, in which the thiocarbonate is dissolved. In order to obtain a solid polymer and one which can be liquefied to a product containing the desired mercapto (—SH) groups, it is essential to use a small proportion of 1,2,3-trichloropropane as cross-linking agent. Increasing proportions of trichloropropane increase the proportion of solid product in the resulting polymer, proportions of at least about 2 mole percent based on the total organic chlorides, i.e., 2 moles of trichloropropane to 98 moles of bis-(2-chloroethyl)-formal being necessary for the production of appreciable proportions of solid, i.e., acetone-insoluble, polymer. Proportions greater than about 10 mole percent result in products which are intractable and are too highly cross-linked for ready liquefaction. In general, the molar quantity of alkali metal trithiocarbonate used will be substantially equal to the chemically equivalent quantity of the combined organic chlorides used.

In general, it is preferred to blanket the reactants with nitrogen or other inert gas to avoid premature oxidation of the thiocarbonate group. Polymerization is usually complete in a period of not more than about 50 hours with the production of good yields of solid polymer usually in about 10 to 30 hours. Temperatures of reaction should not exceed about 100° C. and preferably should be maintained in the range between about 40° C. and about 60° C. As the reaction is exothermic, cooling may be required to maintain the desired temperatures.

The resulting product may be a mixture of solid and liquid polymers which can be separated from each other by successive extractions with ethyl alcohol and acetone. The acetone-insoluble portion is the desired solid polymer.

(2) The second step, or liquefaction of the solid polymer, is carried out by dissolving the polymer in aniline and heating the mixture to between about 90° C. and about 100° C. for a period of at least about one hour. The polymer is then reprecipitated by mixing the solution with a nonsolvent, such as ethyl alcohol, and separating the insoluble liquid oil.

The use of aniline as the liquefying agent appears to be unique, as other amines, including pyridine and diethylenetriamine, fail to reduce the viscosity of the polymer. Other agents, including hydrochloric acid, sodium hydroxide, and agents which are highly effective in liquefying the polysulfide polymers, e.g., sodium sulfide, (Na₂S), and sodium hydrosulfide (NaHS) are ineffective.

The quantity of aniline used to dissolve the polymer is not critical so long as it is enough to provide substantially complete solution. A quantity of aniline ranging in weight from about 0.4 times up to about 5 times the weight of the polymer is usually sufficient.

The liquefied polymers obtained as described above are capable of being cured at room temperatures (ca. 20° C.), or at elevated temperatures, to rubber-like solids, and thus are useful in a variety of applications, including coating and impregnating compositions and in sealing and caulking materials, particularly for use in sealing curtain-wall expansion joints. They are also useful in the preparation of irregularly shaped rubber-like articles which can conveniently be made from my polymers by casting the liquid polymer in a suitable mold and curing it therein to produce the desired rubber-like article.

(3) Curing the liquid polymers of the invention is carried out by treating the polymer with an oxidizing agent to react with the mercapto groups. Any of the conventional oxidizing agents may be employed, such as air, oxygen, metallic oxides and peroxides; as well as oxygen-containing salts, such as chromates, permanganates, etc. When the liquid polymer is to be used as a coating or as an impregnant for porous materials, such as paper, leather, or the like, curing can be effected by subjecting the liquid coating to the action of air or oxygen. Where the polymer is to be used in sealing, caulking, or in the fabrication of solid parts, the choice of oxidizing agent will be governed to some extent by the end use, an oxidizing agent being selected which can suitably remain in the final product. I have found lead dioxide to be especially effective as a curing agent. Proportions of curing agent to polymer will vary depending on the curing agent used and the rapidity and completeness of cure desired. With lead dioxide, quantities between about 10% and about 40% by weight of the polymer are satisfactory.

The following specific examples further illustrate the invention. Parts are by weight except as otherwise noted.

The remaining 9.5 grams of solid material which had been washed with acetone was transferred to a vessel and stirred with water to remove by-product sodium chloride, leaving three grams of a light olive colored gum which was insoluble in acetone, ethyl alcohol, water, xylene, and methyl ethyl ketone, but which was slowly soluble in cyclohexanone. About one half of the gum was dissolved in cyclohexanone, and the solution was dried with anhydrous sodium sulfate and filtered. The cyclohexanone was distilled from the solution under vacuum at 95° C. leaving a viscous, sticky residue. The resulting cross-linked solid polythiocarbonate was composed of repeating units of the same character as those illustrated above for the liquid cross-linked polymer.

EXAMPLE 2

Polymers were prepared as described in Example 1 above by reaction of sodium trithiocarbonate with dichloroethyl formal with 0, 2, and 5 mole percent of the formal replaced by equivalent amounts of 1,2,3-trichloropropane and employing a reaction time of 48 hours. The three polymers thus obtained were extracted successively with alcohol, acetone, and cyclohexanone. The yields and viscosities of the fractions from the three polymers are shown in Table I below.

TABLE I.—YIELDS AND VISCOSITIES OF THIOCARBONATE POLYMERS PREPARED FROM MIXTURES CONTAINING DIFFERENT AMOUNTS OF TRICHLOROPROPANE

| Mole percent of trichloropropane | Sample number Fraction soluble in— | | | Yield (percent) of fraction soluble in— | | | Total yield, percent | Viscosity of fraction soluble in— | | |
|---|---|---|---|---|---|---|---|---|---|---|
| | Alcohol | Acetone | Cyclohexanone | Alcohol | Acetone | Cyclohexanone | | Alcohol | Acetone | Cyclohexanone |
| 0 | 2.1 | 2.2 | 2.3 | 44 | 39 | 16 | 99 | Thin liquid | Slightly viscous oil. | Very viscous oil. |
| 2 | 2.4 | 2.5 | 2.6 | 30 | 38 | 11 | 79 | ___do___ | Very viscous oil. | Semi-solid flowed. |
| 5 | 2.7 | 2.8 | 2.9 | 25 | 29 | 26 | 80 | ___do___ | ___do___ | Semi-solid flowed very slowly. |

EXAMPLE 1

*Preparation of cross-linked polymer in alcohol*

A mixture of 14.9 grams of sodium trithiocarbonate, 16.2 grams of bis-(2-chloroethyl)-formal, 0.56 gram of 1,2,3-trichloropropane, and 185 ml. of absolute ethyl alcohol was prepared in a reaction vessel. The mixture was heated and stirred at reflux temperature of 78° C. under nitrogen for six hours, then allowed to stand at 25° C. for sixteen hours. The resulting solid material from the reaction was collected on a fritted-glass funnel and washed several times with acetone. The combined filtrate and washings were distilled under vacuum at 50° C. to remove alcohol and acetone, leaving as residue 14.7 grams of an orange-yellow oil equivalent to a 75% yield of a product composed of the following repeating units:

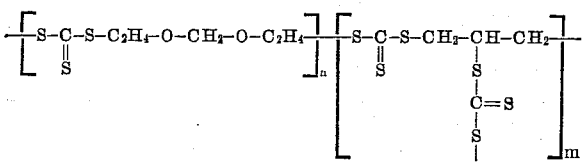

with *n* to *m* in the ratio of about 23.5:1.

It will be noted from Table I that the alcohol-soluble fraction of each polymer was a thin liquid, the acetone-soluble fraction was a slightly viscous to very viscous oil, and the cyclohexanone-soluble fraction was a very viscous oil or a semi-solid. It is also apparent that the viscosities of both the acetone-soluble fraction and the cyclohexanone-soluble fraction were higher as larger proportions of trichloropropane were used in preparation of the polymers.

Infrared absorption curves of the acetone-soluble fraction and the cyclohexanone-soluble fraction from the polymer prepared with 2 mole percent of trichloropropane were identical, (except for a peak in the carbonyl region of the curve of the cyclohexanone-soluble fraction, probably due to a trace of cyclohexanone in that fraction), indicating that the two fractions differed only in degree of polymerization.

EXAMPLE 3

*Liquefaction of solid polymer*

Portions of the viscous and semi-solid polymers produced in Example 2 above, in 4.5 gram amounts, were each dissolved in a 10 ml. portion of aniline and heated on a boiling water bath for three hours. Each solution was then poured into a 100 ml. portion of hot alcohol and heated to boiling. Oils separated which were dried in a vacuum oven at 70° C. for three hours. The resulting oils were more fluid than the original samples, indicating that the following reactions had taken place:

wherein each R″ represents the mercapto-terminated polymer radical

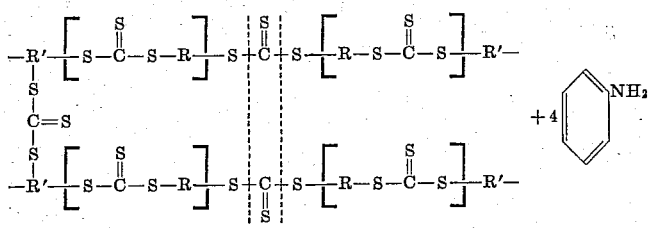

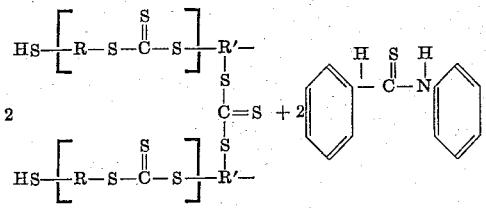

wherein R is the residue of bis-(2-chloroethyl)-formal, and R' is the residue of trichloropropane. In contrast to the results obtained with aniline, similar treatments of the polymers with pyridine, diethylenetriamine, and ammonium hydroxide had no liquefying effect on the polymers. Results are shown in Table II. Heating of aqueous dispersions of the polymers with NaSH, Na₂S, or HCl also produced no apparent change in the viscosity of the polymer.

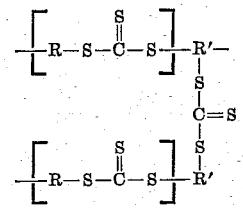

of Example 3.

TABLE II.—RESULTS OF EXPERIMENTS ON LIQUEFACTION OF THIOCARBONATE POLYMERS

| Sample number before treatment [1] | Initial form | Treatment [2] | Change resulting from treatment |
|---|---|---|---|
| 2.6 | Semi-solid | Aniline | Became more fluid. |
| 2.6 | ----do---- | Pyridine | Darkened. |
| 2.6 | ----do---- | Diethylenetriamine | None. |
| 2.6 | ----do---- | Ammonium hydroxide (conc.) | Do. |
| 2.8 | Very viscous oil | Aniline | Became more fluid. |
| 2.9 | Semi-solid | ----do---- | Do. |

[1] See Table I.
[2] The polymers were treated for 2 hours at 90° to 100° C.

EXAMPLE 4

Curing the liquid polymer

Samples of the liquid, acetone-soluble polymers obtained in Example 2 above, and samples of the liquid polymers produced in Example 3 by aniline treatment of the semi-solid polymers of Example 2, were mixed with 30% of lead dioxide; and individual samples were allowed to stand for two hours at 100° C. and for three days at 25° C. with a view to curing, i.e., hardening, the polymer by oxidation according to the reactions:

R″—(HS)₂+PbO₂→—R″—S—S—R″+H₂O+PbO
R″—(HS)₂+PbO→—R″—S—Pb—S—R″+H₂O

In the specific tests, 0.5 gram samples of polymer were mixed with 0.1 to 0.2 grams of PbO₂ and the mixtures were blended with a spatula until uniformly mixed. A portion of each mixture was heated in an oven at 100° C. for 0.5 hour, allowed to cool, then examined for flow. The remainder of the sample was placed in a sample vial, kept at 25° C. and examined again three days later. Flow was observed by noting how rapidly the liquid moved when the vial was moved from a vertical to a horizontal position.

Results of these tests are shown in Table III.

TABLE III.—RESULTS OF CURING LIQUID THIOCARBONATE POLYMERS WITH LEAD DIOXIDE

| Polymer Sample | | Curing Results [1] | |
|---|---|---|---|
| Original Sample Number | Description | 2 Hr. at 100° C. | 3 Days at 25° C. |
| 2.2 | Acetone-soluble polymer (0% trichloropropane). | No cure | No cure. |
| 2.8 | Acetone-soluble polymer (5% trichloropropane). | ----do---- | Thickened slightly, flowed readily. |
| 2.9 | Cyclohexanone-soluble polymer (5% trichloropropane). | Thickened | Tacky semi-solid, slight flow in 15 min. |
| 2.6 | Aniline-treated polymer | Thickened slightly. | Viscous liquid, flow visible in 1 min. |
| 2.9 | ----do---- | Thickened | Tacky solid, slight flow in 10 min. |

[1] Minutes to flow refers to the time required for sample to move when sample holder was moved from vertical to a horizontal position.

It will be noted from Table III that the original liquid acetone-soluble polymer prepared with 5% trichloropropane appeared to be unchanged after heating with PbO$_2$; but, after three days at room temperature, it was thicker than it was without PbO$_2$, although it was still fluid. When a sample of the polymer was first heated with aniline and then cured with PbO$_2$, it was thinned by the aniline; but, after curing, it became more viscous than the sample that had not been treated with aniline. The acetone-insoluble cyclohexanone-soluble polymer was a viscous liquid before the curing, but it thickened appreciably on curing to the point that practically no fluidity could be detected.

EXAMPLE 5

Aqueous emulsion polymerization

A solution containing 1.0 mole of potassium trithiocarbonate was prepared according to the method of Strube (Organic Synthesis 39, 77 (1959)) from potassium hydroxide, hydrogen sulfide, and carbon disulfide as follows: Hydrogen sulfide gas (34 grams) was passed into a solution containing 56 grams of potassium hydroxide in 90 ml. of water, and then 56 grams more of KOH and 23 ml. of water were added to the solution. The solution was cooled, and 76 grams of carbon disulfide was added, and the solution was stirred under a nitrogen atmosphere until the carbon disulfide dissolved (3 hours). An emulsion was prepared by adding to the K$_2$CS$_3$ solution prepared as described above, 0.3 ml. of a 30% aqueous solution of an alkyl aryl sulfonate (Santomerse SX) and then, with vigorous agitation, adding a mixture of 160 grams (0.925 mole) of bis-(2-chloroethyl)-formal and 7.4 grams (0.05 mole) of trichloropropane.

The resulting emulsion was heated to about 60° C., whereupon a strongly exothermic reaction started. The mixture was cooled, the temperature was maintained at 40–65° C. with stirring for one hour, and then a sample was withdrawn. The temperature was then brought to 55–60° C. and heated for an additional 42 hours, samples being taken at the end of 4 hours and 19 hours. The reaction was terminated after a total of 43 hours, at which time the mixture was so viscous that it could not be stirred by a heavy-duty magnetic stirrer.

Water was added to each of the samples that were taken after 1, 4, 19, and 43 hours. On standing a short time (ca. 30 minutes) the diluted samples separated into a lower layer of viscous latex and an upper layer of aqueous solution. The two layers were separated, and the aqueous layer was acidified, causing some oily material to precipitate. The water-insoluble latex layer from the initial separation was washed six times with water and once with dilute acid. A sample of the washed latex was dried in a vacuum oven at 60° C. and was found to contain 51% solids corresponding to a polymer yield of 70% of theory. The remainder of the washed latex layer was air dried and extracted first with ethyl alcohol, then with acetone. The proportions of alcohol-soluble, acetone-soluble, and insoluble polymer in each sample are shown in Table IV below:

A sample of the acetone-insoluble fraction of the polymer was purified by dissolving it in dimethyl formamide and reprecipitating it by pouring the solution into water. The product after drying was found to contain 40.6% sulfur.

While the above describes the preferred embodiments of my invention, it will be understood that departures can be made therefrom within the scope of the specification and claims.

I claim:

1. The process for preparing a solid polymeric material capable of being successively liquefied by scission to a liquid polymer and then cured by oxidation to a solid polymeric material which consists essentially of heating a mixture of bis-(2-chloroethyl)-formal and 1,2,3-trichloropropane in the proportions of between about 2 moles and about 10 moles of 1,2,3-trichloropropane per 100 moles of mixture, the balance being bis-(2-chloroethyl)-formal, with a quantity of an alkali metal trithiocarbonate substantially chemically equivalent to the two chloro compounds, at temperatures between about 40° C. and about 100° C. for a period sufficient to produce a solid polymeric product.

2. The process for preparing a liquid polymer characterized by the presence of the following repeating units:

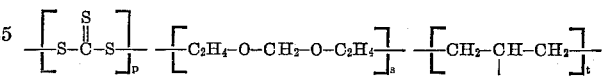

linked in random fashion through the thiocarbonate groups, said units being present in proportions such that $p$ is less than $s+t$; $s$ is present in the range between 90% and 98%, and $t$ is present in the range between 2% and 10% of the total units $s+t$; and further characterized by the presence of a minor proportion of sulfhydryl terminal groups, which consists essentially of heating a mixture of bis-(2-chloroethyl)-formal and 1,2,3-trichloropropane in the proportions of between about two moles and about 10 moles of 1,2,3-trichloropropane per 100 moles of mixture, the balance being essentially bis-(2-chloroethyl)-formal, with a quantity of an alkali metal trithiocarbonate substantially chemically equivalent to the sum of the two chloro compounds, at temperatures between about 40° C. and about 100° C. for a period sufficient to produce a solid polymeric product, dissolving the solid polymer thus obtained in aniline, heating the resulting solution to liquefy the polymer and thereafter recovering the liquid polymer.

3. The process for preparing a solid polymer characterized by the presence of a major proportion of the following repeating units:

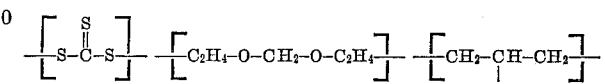

and further characterized by the presence of minor proportions of —S—S— groups present as linking units, said repeating units being linked in random fashion, which consists essentially of heating a mixture of bis-(2-chloroethyl)-formal and 1,2,3-trichloropropane in the proportions of between about two moles and about 10 moles

TABLE IV.—EFFECTS OF HEATING TIME ON SOLUBILITY OF TRITHIOCARBONATE POLYMER

| Heating time, hr. | Precipitate from aqueous layer on acidification | Fractions, percent | | |
|---|---|---|---|---|
| | | Alcohol soluble | Acetone soluble | Insoluble |
| 1 | Heavy precipitate of oily liquid | [1] 50 | [1] 50 | |
| 4 | ----do---- | [1] 30 | [1] 70 | |
| 19 | Small amount of an oily liquid | [1] 5 | [1] 75 | [2] 20 |
| 43 | Trace of oily liquid | [1] 2 | [2] 44 | [3] 54 |

[1] Thin liquid.  [2] Viscous liquid.  [3] Semi-solid tar.

of 1,2,3-trichloropropane per 100 moles of mixture, the balance being essentially bis-(2-chloroethyl)-formal, with a quantity of an alkali metal trithiocarbonate substantially chemically equivalent to the sum of the two chloro compounds, at temperatures between about 40° C. and about 100° C. for a period sufficient to produce a solid polymeric product, dissolving the solid polymer thus obtained in aniline, heating the resulting solution to liquefy the polymer and thereafter mixing said liquid polymer with an oxidizing agent.

4. A polymeric material characterized by the presence of the following repeating units:

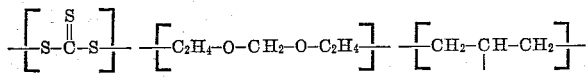

linked in random fashion through the thiocarbonate groups.

5. A polymeric material characterized by the presence of the following repeating units:

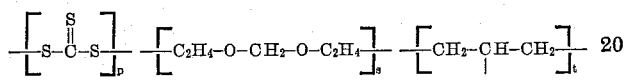

linked in random fashion through the thiocarbonate groups, said units being present in proportions such that $p$ and $s+t$ are in the ratio of 1:1; $s$ is present in the range between 0.90 and 0.98, and $t$ is present in the range between 0.02 unit and 0.10 unit per unit of $p$.

6. A liquid polymeric material characterized by the presence of the following repeating units:

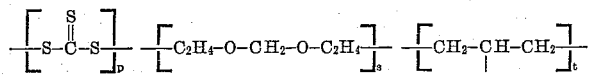

linked in random fashion through the thiocarbonate groups, said units being present in proportions such that $p$ is less than $s+t$; $s$ is in the range between 90% to 98%; and $t$ is in the range between 2% and 10% of the total of $s+t$; and further characterized by the presence of terminal sulfhydryl (—SH) groups.

7. A solid polymeric material characterized by the presence of a major proportion of the following repeating units:

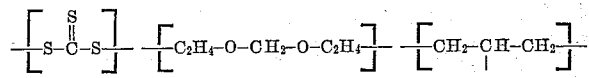

and a minor proportion of —S—S— units, said units being linked in random fashion through the thiocarbonate and disulfide units.

8. A polymeric material characterized by the presence of the following repeating units:

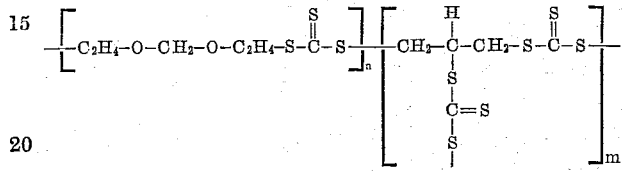

wherein $n$ is at least about ten and $m$ is at least about one, and wherein the ratio between $n$ and $m$ is between about 10:1 and about 50:1.

References Cited
UNITED STATES PATENTS 2,532,369 12/1950 Patrick et al. _____ 260—79.1
3,166,580 1/1965 Stanley _____ 260—455

FOREIGN PATENTS 661,362 11/1951 Great Britain.

DONALD E. CZAJA, *Primary Examiner.*

M. I. MARQUIS, *Assistant Examiner.*